(12) United States Patent
Mejia (10) Patent No.: US 7,884,308 B1
(45) Date of Patent: Feb. 8, 2011

(54) SOLAR-POWERED SUN TRACKER

(76) Inventor: Manuel J. Mejia, 302 Walnut Court Way, Kennett Square, PA (US) 19348-3388

( * ) Notice: Subject to any disclaimer, the term of this patent is extended or adjusted under 35 U.S.C. 154(b) by 0 days.

(21) Appl. No.: 12/709,654

(22) Filed: Feb. 22, 2010

(51) Int. Cl.
*G01J 1/20* (2006.01)
*F24J 2/38* (2006.01)

(52) U.S. Cl. .................... 250/203.4; 126/576; 126/578; 136/246

(58) Field of Classification Search .............. 250/203.4; 126/569, 572–582; 136/243, 244, 246
See application file for complete search history.

(56) References Cited

U.S. PATENT DOCUMENTS

| | | | | |
|---|---|---|---|---|
| 3,229,102 | A | * | 1/1966 | Spencer et al. ............... 250/216 |
| 4,027,651 | A | * | 6/1977 | Robbins, Jr. ................. 126/601 |
| 4,031,385 | A | * | 6/1977 | Zerlaut et al. ............ 250/203.4 |
| 4,146,784 | A | | 3/1979 | Yekutieli |
| 4,179,612 | A | * | 12/1979 | Smith ....................... 250/203.4 |
| 4,225,781 | A | | 9/1980 | Hammons |
| 4,328,417 | A | | 5/1982 | Himes |
| 4,361,758 | A | * | 11/1982 | Rotolo ..................... 250/203.4 |
| 4,365,616 | A | * | 12/1982 | Vandenberg ................. 126/581 |
| 4,396,006 | A | * | 8/1983 | Cross, Jr. ..................... 126/580 |
| 4,404,465 | A | * | 9/1983 | Miller ..................... 250/203.4 |
| 4,419,981 | A | * | 12/1983 | Mori ........................... 126/575 |
| 4,611,914 | A | * | 9/1986 | Homma ..................... 356/141.5 |
| 4,620,771 | A | * | 11/1986 | Dominguez ................. 359/591 |
| 4,649,899 | A | | 3/1987 | Moore |
| 4,786,795 | A | | 11/1988 | Kurashima et al. |
| 4,794,909 | A | * | 1/1989 | Eiden .......................... 126/575 |
| 4,868,379 | A | * | 9/1989 | West ....................... 250/203.4 |
| 6,005,236 | A | * | 12/1999 | Phelan et al. ............ 250/203.4 |
| 6,018,122 | A | * | 1/2000 | Hibino et al. ................ 136/246 |
| 6,089,224 | A | | 7/2000 | Poulek |

(Continued)

OTHER PUBLICATIONS

Solar World, Sun Tracker, 1998, pp. 1-24.

*Primary Examiner*—John R Lee
(74) *Attorney, Agent, or Firm*—Arthur Jacob (57) ABSTRACT

A power solar panel is maintained in an optimum position relative to the sun during daylight as the sun traverses a solar track elevated above the horizon and extending from a sunrise location to a sunset location during each day of consecutive days of the year by utilizing solar energy to power a sun tracker which carries the power solar panel. The sun tracker includes pairs of solar modules wherein the solar modules are arrayed in an A-shaped cross-sectional configuration for being aimed directly at the sun in response to exposure to the sun, and the pairs of solar modules power motors which tilt the solar panel about a horizontal direction and rotate the power solar panel about a vertical direction to maintain optimum alignment with the sun during the course of a day. Two of the pairs of solar modules are connected alternately to a motor that rotates the solar panel about the vertical direction and are mounted spaced apart in transverse directions, diametrically opposite one another with respect to the vertical direction, and for tilting about lateral directions to aim each of the two pairs toward the solar track such that a first one of the two pairs powers the motor during one day of consecutive days, and the second one of the two pairs powers the motor during a next-consecutive day, thereby compensating for daily changes in the solar track and providing power for effective operation during consecutive days throughout the year.

11 Claims, 5 Drawing Sheets

U.S. PATENT DOCUMENTS

| | | | |
|---|---|---|---|
| 6,465,725 B1 * | 10/2002 | Shibata et al. | 136/246 |
| 7,115,850 B2 * | 10/2006 | Niemann et al. | 250/203.4 |
| 7,705,277 B2 * | 4/2010 | Noble et al. | 250/203.4 |
| 7,763,835 B2 * | 7/2010 | Romeo | 250/203.4 |
| 2007/0074716 A1 * | 4/2007 | Mc Nulty et al. | 126/578 |
| 2009/0194669 A1 * | 8/2009 | Noble et al. | 250/203.4 |
| 2009/0302199 A1 * | 12/2009 | Sepehry-Fard et al. | 250/203.4 |
| 2010/0059043 A1 * | 3/2010 | Hong et al. | 126/573 |

* cited by examiner

SOLAR-POWERED SUN TRACKER

BACKGROUND OF THE INVENTION

The present invention relates generally to utilizing solar energy and pertains, more specifically, to a sun tracker powered by solar energy and a method to maintain a power solar panel in an optimum position relative to the sun as the sun traverses a solar track during the course of each day of consecutive days.

The sun long has been viewed as a convenient and abundant source of renewable energy. A more recent emphasis on the utilization of reusable sources of energy has prompted the development of more efficient solar panels and has led to a myriad of innovations directed toward providing a practical apparatus suitable for widespread adoption in harnessing solar energy. A great deal of effort has gone into the design and development of sun trackers which can track the sun to orient one or more power-generating solar panels in an optimum alignment relative to the sun as the sun traverses the sky during each day, thereby increasing the effectiveness of such solar panels.

The present invention makes use of currently available solar module technology to provide a sun tracker that is powered by solar energy to maintain a power solar panel in an optimum position relative to the sun as the sun moves along a solar track during each day of consecutive days, and a method for doing so. As such, the present invention attains several objects and advantages, some of which are summarized as follows: Provides a sun tracker powered by solar energy to maintain optimum orientation of a power solar panel relative to the sun during each day of consecutive days; enables the use of a relatively simple and economical solar powered sun tracker in a wide variety of installations, ranging from smaller, domestic installations to larger commercial and industrial installations; increases the efficiency with which solar energy is captured for practical utilization in a wide variety of settings; compensates automatically for changes in the position of the sun in the sky from day to day and over season to season throughout the year, including changes in sunrise and sunset locations of the sun along the horizon, as well as changes in elevation above the horizon; enables the economical construction and practical use of a solar powered sun tracker for greater efficiency in a wider variety of installations, including even small installations where sun trackers heretofore have been too complex for practical use; enables solar powered sun tracking with greater simplicity for widespread economical use; provides solar powered sun tracking with increased reliability and exemplary performance over an extended service life.

BRIEF SUMMARY OF THE INVENTION

The above objects and advantages, as well as further objects and advantages, are attained by the present invention, which may be described briefly as a solar powered sun tracker for maintaining a power solar panel in an optimum position relative to the sun during daylight as the sun traverses a solar track elevated above the horizon and extending from a sunrise location to a sunset location during each day of consecutive days, the sun tracker comprising: a frame rotatable about a vertical direction; a platform for carrying the power solar panel in an upwardly-facing orientation, the platform being mounted on the frame for tilting about a first horizontal direction to aim the power solar panel along a first aiming direction; a first motor coupled with the platform for tilting the platform about the horizontal direction in either one of opposite tilt directions to aim the first aiming direction; a first pair of solar modules extending along the horizontal direction and arrayed in an A-shaped cross-sectional configuration substantially symmetrical about the first aiming direction, the first pair of solar modules being mounted for movement with the platform to tilt with the platform about the horizontal direction and connected to the first motor for powering the first motor to tilt the platform so as to move the first aiming direction into an optimum alignment with the sun in response to exposure of the first pair of solar modules to the sun; a second pair of solar modules arrayed in an A-shaped cross-sectional configuration substantially symmetrical about a second aiming direction, the second pair of solar modules extending along a corresponding longitudinal direction making a corresponding aiming angle with the vertical direction and mounted on the frame for tilting about a corresponding lateral direction to change the corresponding aiming angle; a third pair of solar modules arrayed in an A-shaped cross-sectional configuration substantially symmetrical about a third aiming direction, the third pair of solar modules extending along a corresponding longitudinal direction making a corresponding aiming angle with the vertical direction and mounted on the frame, opposite the second pair of solar modules with respect to the horizontal direction, for tilting about a corresponding lateral direction to change the corresponding aiming angle; a second motor coupled with the second and third pairs of solar modules for tilting each second and third pair of solar modules about a respective corresponding lateral direction to change each respective corresponding aiming angle; a fourth pair of solar modules arrayed in an A-shaped cross-sectional configuration substantially symmetrical about the first aiming direction, the fourth pair of solar modules extending along the horizontal direction and being mounted for movement with the platform for tilting with the platform about the horizontal direction, the fourth pair of solar modules being connected to the second motor for powering the second motor to tilt each of the second and third pairs of solar modules about a corresponding lateral direction to change a corresponding aiming angle and direct the second and third aiming directions to establish an optimum alignment of each second and third pair of solar modules relative to the sun; a third motor coupled with the frame for rotating the frame about the vertical direction; and a controller for connecting the second pair of solar modules to the third motor to power the third motor for rotating the frame as the sun traverses the solar track during a day, and for connecting the third pair of solar modules to the third motor during a next-consecutive day such that the third motor is powered alternately by the second and third pairs of solar modules to rotate the frame during consecutive days, while the second motor is powered by the fourth pair of solar modules to tilt the second an third pairs of solar modules into an optimum orientation relative to the sun, and the first motor is powered by the first pair of solar modules to tilt the platform and aim the power solar panel into an optimum orientation relative to the sun during each day.

In addition, the present invention provides a method for maintaining a power solar panel in an optimum position relative to the sun during daylight as the sun traverses a solar track elevated above the horizon and extending from a sunrise location to a sunset location during each day of consecutive days, the method comprising: placing the power solar panel in an upwardly-facing orientation mounted for tilting about a horizontal direction to aim the power solar panel along a first aiming direction, and for rotation about a vertical direction; coupling a first motor with the power solar panel for tilting the power solar panel about the horizontal direction in either one of opposite tilt directions to aim the first aiming direction; mounting a first pair of solar modules extending along the horizontal direction and arrayed in an A-shaped cross-sectional configuration substantially symmetrical about the first aiming direction for movement with the power solar panel to tilt with the power solar panel about the horizontal direction; connecting the first pair of solar modules to the first motor for powering the first motor to tilt the power solar panel so as to move the first aiming direction into an optimum alignment with the sun in response to exposure of the first pair of solar modules to the sun; providing a second pair of solar modules arrayed in an A-shaped cross-sectional configuration substantially symmetrical about a second aiming direction, the second pair of solar modules extending along a corresponding longitudinal direction making a corresponding aiming angle with the vertical direction, and mounting the second pair of solar modules for tilting about a corresponding lateral direction to change the corresponding aiming angle; providing a third pair of solar modules arrayed in an A-shaped cross-sectional configuration substantially symmetrical about a third aiming direction, the third pair of solar modules extending along a corresponding longitudinal direction making a corresponding aiming angle with the vertical direction, and mounting the third pair of solar modules diametrically opposite the second pair of solar modules with respect to the vertical direction for tilting about a corresponding lateral direction to change the corresponding aiming angle; coupling a second motor with the second and third pairs of solar modules for tilting each second and third pair of solar modules about a respective corresponding lateral direction to change each corresponding aiming angle; providing a fourth pair of solar modules arrayed in an A-shaped cross-sectional configuration substantially symmetrical about the first aiming direction, the fourth pair of solar modules extending along the horizontal direction, and mounting the fourth pair of solar modules for movement with the power solar panel for tilting with the power solar panel about the horizontal direction; connecting the fourth pair of solar modules to the second motor for powering the second motor to tilt each of the second and third pairs of solar modules about a corresponding lateral direction to change each corresponding aiming angle and direct the second and third aiming directions to establish an optimum alignment of each second and third pair of solar modules relative to the sun; coupling a third motor with the power solar panel for rotating the power solar panel about the vertical direction; and connecting the second pair of solar modules to the third motor to power the third motor for rotating the power solar panel as the sun traverses the solar track during a day, and connecting the third pair of solar modules to the third motor during a next-consecutive day such that the third motor is powered alternately by the second and third pairs of solar modules to rotate the power solar panel during consecutive days, while the second motor is powered by the fourth pair of solar modules to tilt the second an third pairs of solar modules into an optimum orientation relative to the sun, and the first motor is powered by the first pair of solar modules to tilt the power solar panel and aim the power solar panel into an optimum orientation relative to the sun during each day.

BRIEF DESCRIPTION OF THE DRAWING

The invention will be understood more fully, while still further objects and advantages will become apparent, in the following detailed description of preferred embodiments of the invention illustrated in the accompanying drawing, in which.

DETAILED DESCRIPTION OF THE INVENTION

Figure 1:
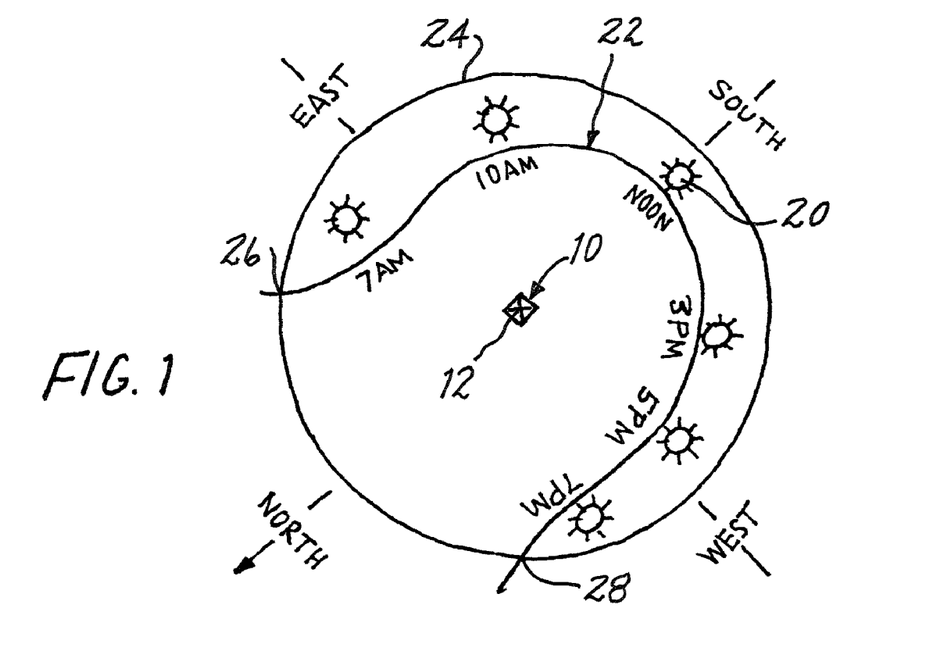
FIGS. 1 through 3 are diagrams depicting a solar track followed by the sun at the summer solstice, at an equinox, and at the winter solstice, respectively.
Figure 2:
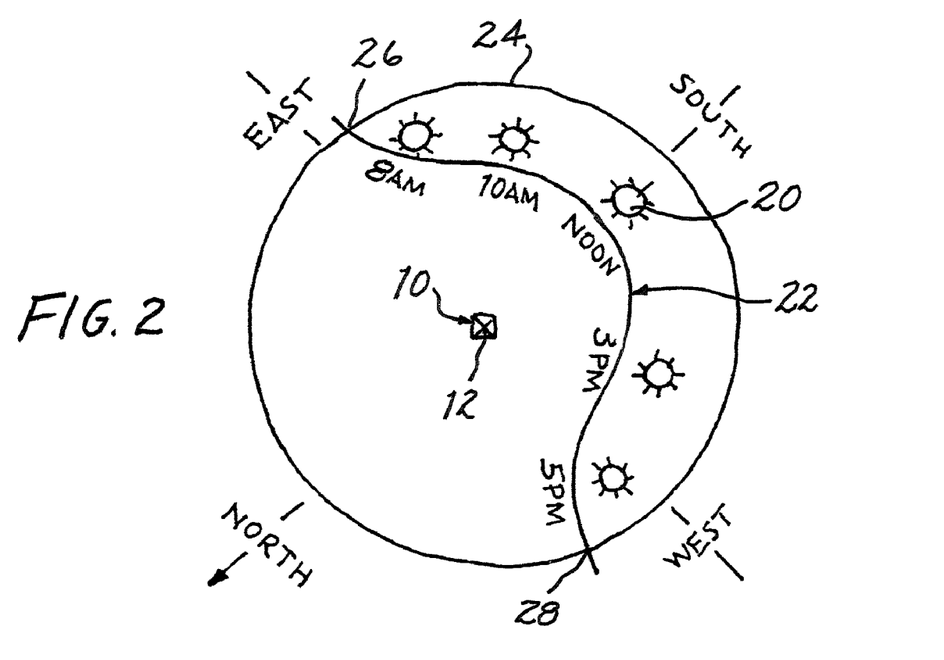
Figures 3, 4:
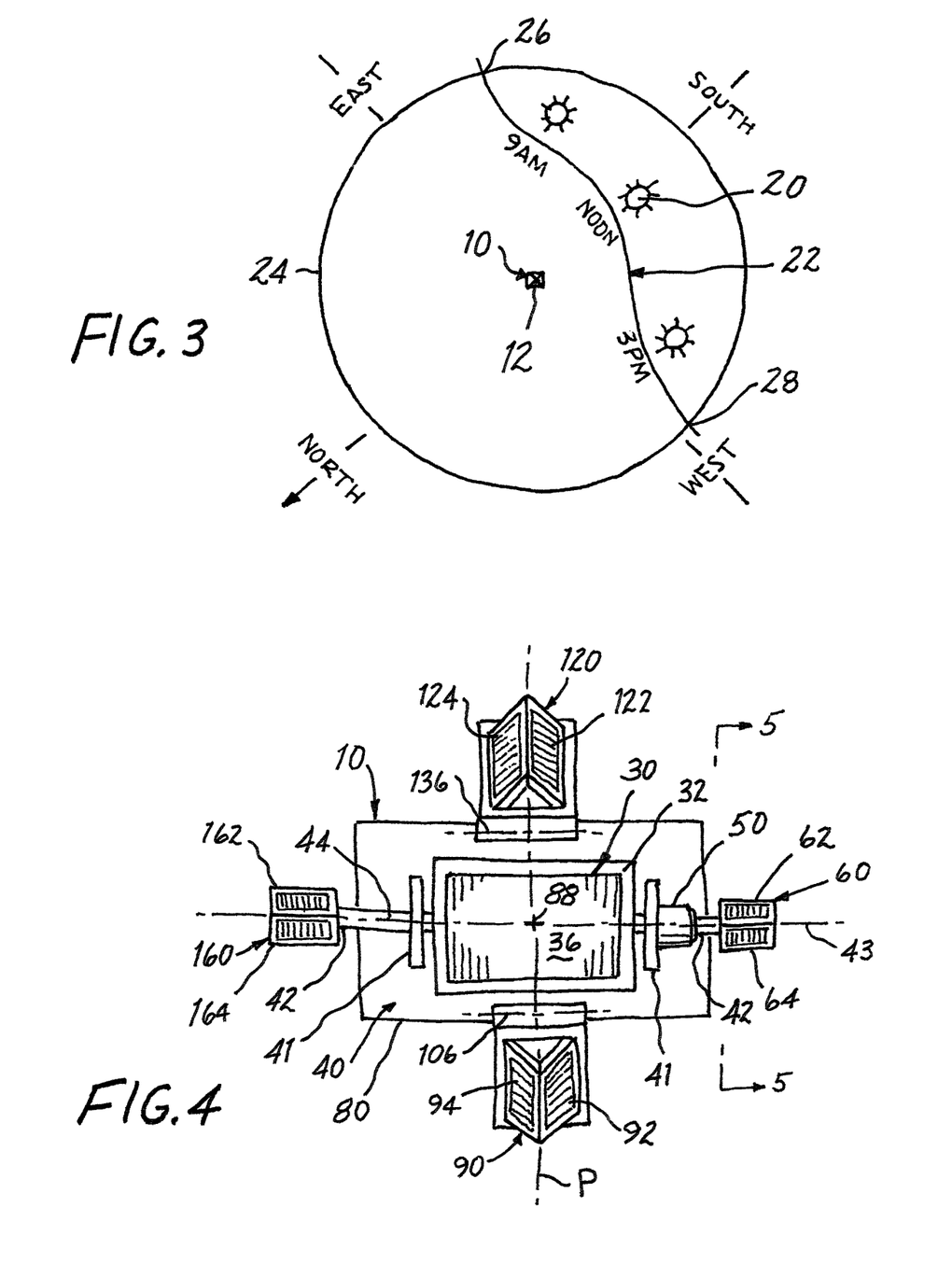
FIG. 4 is a somewhat diagrammatic top plan view of a solar-powered sun tracker constructed in accordance with the present invention.

Referring now to the drawing, and especially to FIGS. 1 through 3 thereof, a solar-powered sun tracker 10 constructed in accordance with the present invention is shown placed on the earth at a site 12, and the position of the sun during each day of consecutive days throughout a year, relative to site 12, is depicted in diagrams showing the sun 20 traversing a solar track 22 at elevations relative to the horizon 24, as viewed along azimuths from site 12, from a sunrise location 26 to a sunset location 28. FIG. 1 depicts the solar track 22 when the earth is at the summer solstice position, while FIG. 2 shows the solar track 22 when the earth is at an equinox position, and FIG. 3 shows the solar track 22 when the earth is at the winter solstice position. From day to day during consecutive days of the year, the sunrise location 26, the sunset location 28 and the elevation of the sun 20 change so that the azimuth is different during each consecutive day. Sun tracker 10 is constructed in order to maintain a power solar panel at an optimum position relative to the sun, that is, aimed along an azimuth directed precisely at the sun 20 at all times during daylight.

Turning now to FIGS. 4 through 9, as well as to FIGS. 1 through 3, a power solar panel 30 is to be maintained at an optimum position relative to the sun 20 as the sun 20 traverses solar track 22 from that sunrise location 26 to the sunset location 28 during each day of consecutive days throughout the year. Sun tracker 10 accomplishes that end utilizing solar energy to power the sun tracker 10 through movements that maintain the requisite aim of the solar panel 30. Accordingly, sun tracker 10 includes a platform 32 upon which power solar panel 30 is carried, with active face 36 of the solar panel 30 in an upwardly-facing orientation, and platform 32 is mounted upon a frame 40 by means of a horizontally extending shaft 42 journaled within posts 41 of frame 40 for rotation relative to frame 40 for tilting about a horizontal direction 43, shown as extending along horizontal axis of rotation 44 of shaft 42, to aim the solar panel 30 along a first aiming direction 48.

Figure 5:
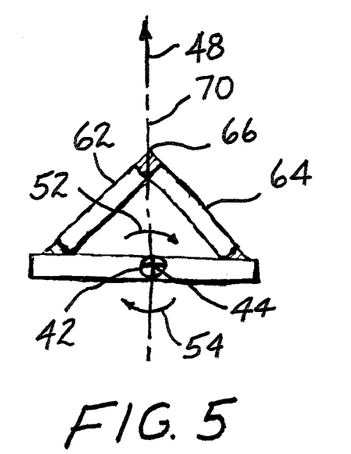
FIG. 5 is an enlarged cross-sectional view taken along line 5-5 of FIG. 4.

A first motor in the form of an electric motor 50 is affixed to the frame 40 and is coupled with the platform 32, through shaft 42, to rotate shaft 42 and thereby tilt the platform 32 relative to the frame 40 about axis of rotation 44 in either one of opposite tilt directions 52 and 54 to aim the first aiming direction 48 toward different elevations above the horizon 24. A first pair 60 of solar modules 62 and 64 extends along the horizontal direction 43, with the solar modules 62 and 64 arrayed in a A-shaped cross-sectional configuration, as seen in FIG. 5, symmetrical about the first aiming direction 48. In the preferred construction, the solar modules 62 and 64 are erected at 90° to one another with the peak 66 of the A-shaped cross-sectional configuration facing upwardly and the first aiming direction 48 lying in a plane of symmetry 70. The first pair 60 of solar modules 62 and 64 is coupled for rotation with shaft 42 and, hence, with platform 32, and the first aiming direction 48 is perpendicular to the active face 36 of solar panel 30.

Figure 6:
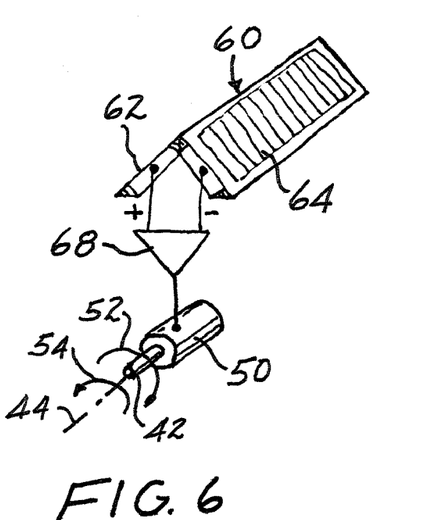
FIG. 6 is a somewhat schematic diagram showing the operation of component parts of the sun tracker.
Figure 7:
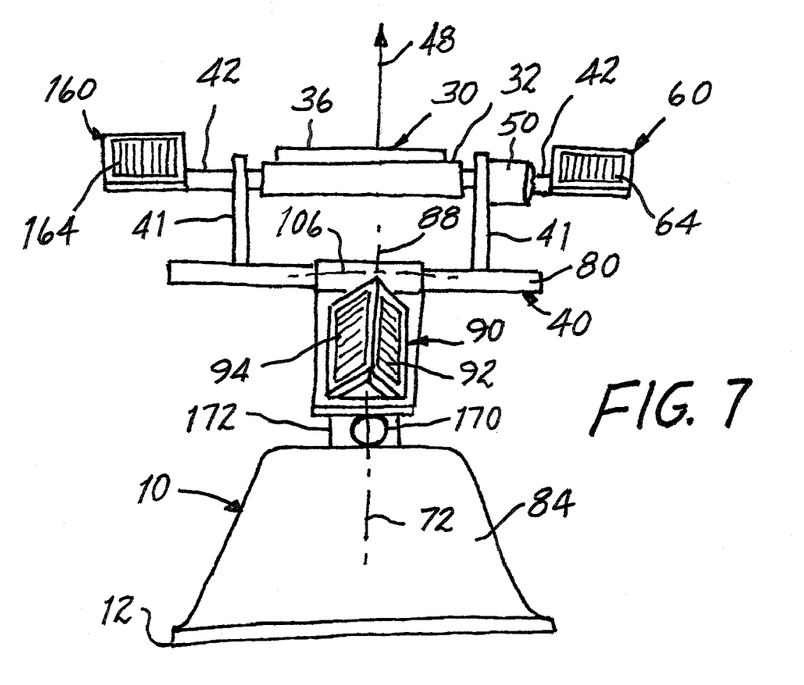
FIG. 7 is a somewhat diagrammatic front elevational view of the sun tracker.
Figure 8:
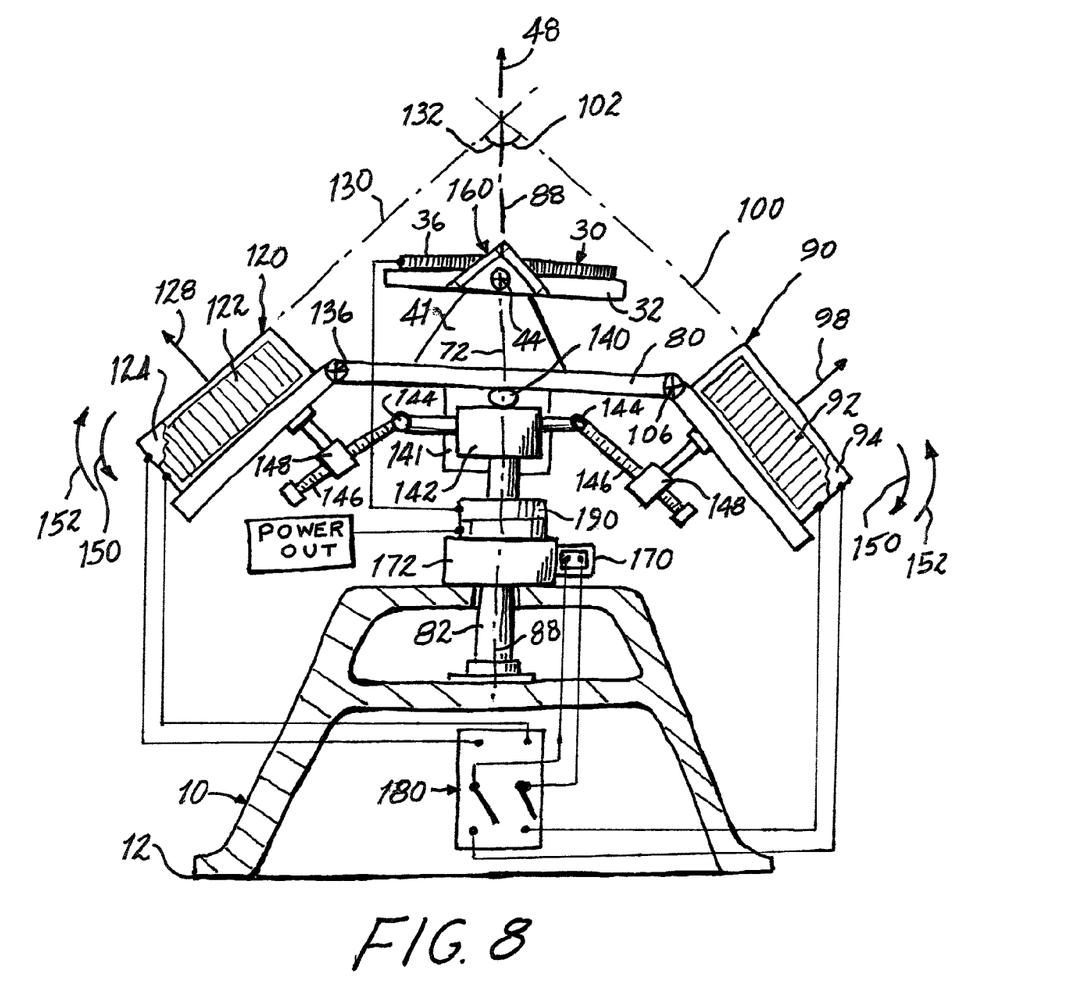
FIG. 8 is a somewhat diagrammatic side elevational view of the sun tracker.

The pair 60 of solar modules 62 and 64 is connected to motor 50 such that upon exposure to the sun 20, the power output of solar module 62 will actuate the motor 50 to tilt the platform 32 in one of the opposite directions 52 and 54, while the power output of solar module 64 will actuate the motor 50 to tilt the platform 32 in the other of the opposite directions 52 and 54, as indicated by the plus and minus signs in FIG. 6 wherein a comparator 68 compares the power output from each solar module 62 and 64 and passes the appropriate output to motor 50. Thus, with the aiming direction 48 aimed somewhat away from directly at the sun 20, the power output of one of the solar modules 62 and 64 will be greater than the power output of the other of the solar modules 62 and 64, and the motor 50 will rotate to tilt the pair 60 of solar modules 62 and 64 until the aiming direction 48 is in direct alignment with the sun 20, at which position the power output from each solar module 62 and 64 will be equal and rotation will be discontinued. With the aiming direction 48 in that optimum alignment with the sun 20, the platform 32 and the power solar panel 30 will be oriented in an optimum position above the horizon 24 relative to the sun 20, that is, aimed directly at the solar track 22. As the sun 20 traverses the solar track 22, an optimum position above the horizon 24 will be maintained, as described below.

Figure 9:
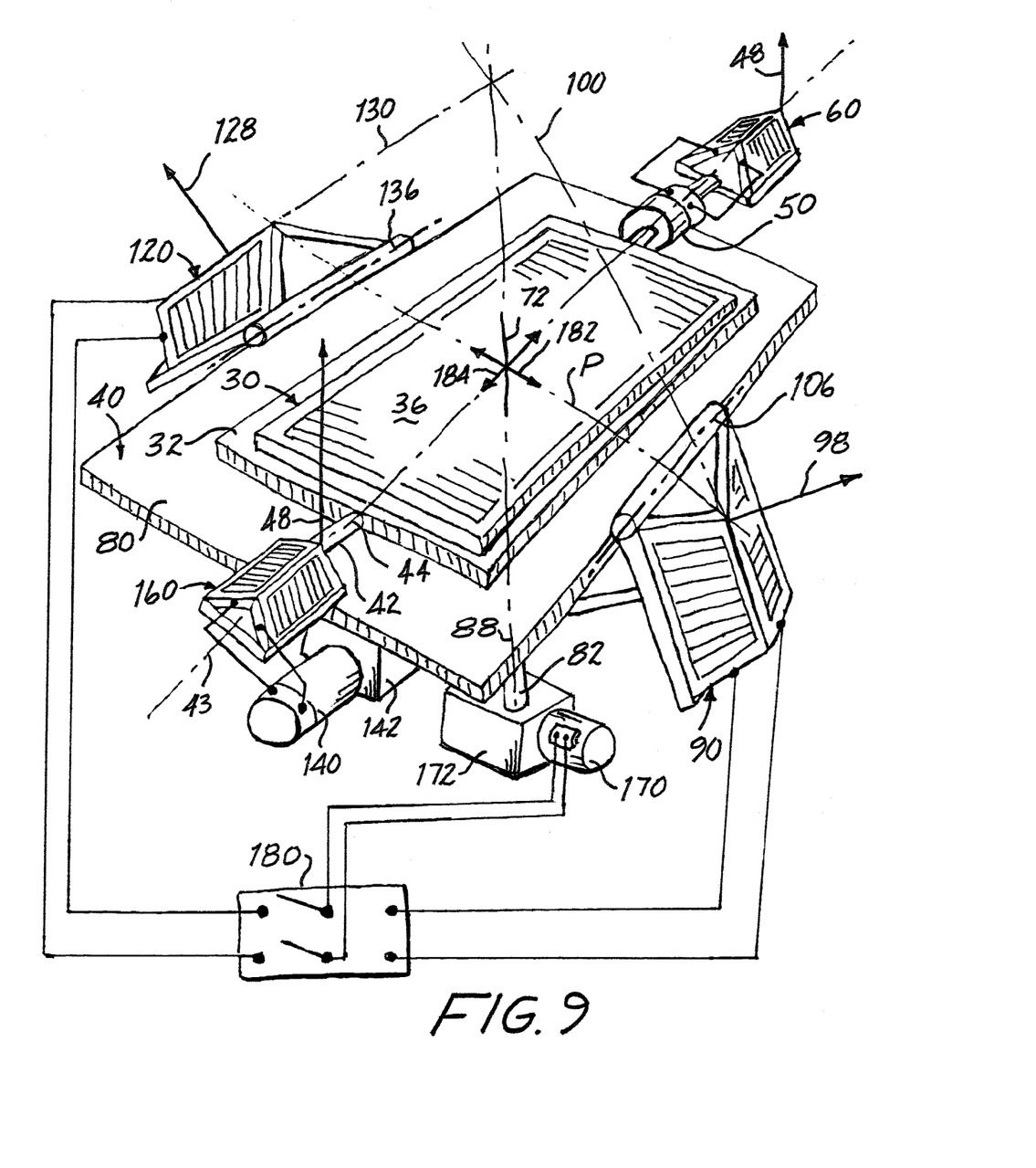
FIG. 9 is a diagrammatic illustration depicting the operation of the sun tracker.

In order to follow the sun 20 along the solar track 22, from the sunrise location 26 to the sunset location 28, frame 40 is mounted for rotation about a vertical direction 72 (see FIG. 9). Thus, frame 40 includes a table 80 secured to a depending shaft 82 journaled for rotation within a base 84 of the sun tracker 10, about a vertical axis of rotation 88. A second pair 90 of solar modules 92 and 94 are arrayed in an A-shaped cross-sectional configuration, in a manner similar to the arrayed first pair 60 of solar modules 62 and 64, and are symmetrical about a second aiming direction 98. The second pair 90 of solar modules 92 and 94 extend along a longitudinal direction 100 which makes an aiming angle 102 with the vertical direction 72 and the vertical axis of rotation 88, and the second pair 90 is mounted upon the table 80 for tilting about a lateral direction 106 to change the aiming angle 102 and, hence, the direction of the second aiming direction 98. In a like manner, a third pair 120 of solar modules 122 and 124 are arrayed in an A-shaped cross-sectional configuration symmetrical about a third aiming direction 128. The third pair 120 of solar modules 122 and 124 extends along a longitudinal direction 130 which makes an aiming angle 132 with the vertical direction 72 and the vertical axis of rotation 88, and the third pair 120 is mounted upon the table 80, diametrically opposite the second pair 90 of solar modules 92 and 94, for tilting about a lateral direction 136 to change the aiming angle 132 and, hence, the direction of the third aiming direction 128.

A second motor in the form of an electric motor 140 is carried by the table 80, affixed to the table 80 by means of a bracket 141, and is coupled with each of the second and third pairs 90 and 120 of respective solar modules for tilting each second and third pair 90 and 120 about respective lateral directions 106 and 136 to change each corresponding aiming angle 102 and 132. To that end, motor 140 drives a gear box 142 which, in turn, is coupled, through corresponding couplings 144, to opposite lead screws 146, each lead screw 146 having a follower 148 carried by a corresponding pair 90 and 120 such that upon actuation of motor 140, pairs 90 and 120 of solar modules will be tilted about corresponding lateral directions 106 and 136, in one of opposite tilt directions 150 and 152, all for purposes described in detail below.

In a fourth pair 160, solar modules 162 and 164 are arrayed in an A-shaped cross-sectional configuration symmetrical about the first aiming direction 48 and are placed so as to extend along the horizontal direction 43, mounted for tilting with the platform 32 about the horizontal direction 43, preferably by affixing the fourth pair 160 to shaft 42 for tilting with rotation of the shaft 42. The pair 160 of solar modules 162 and 164 is connected to motor 140 such that upon exposure to the sun 20, the power output of solar module 162 will actuate the motor 140 to tilt the second and third pairs 90 and 120 about respective lateral directions 106 and 136, in one of the opposite directions 150 and 152, while the power output of solar module 164 will actuate the motor 140 to tilt the second and third pairs 90 and 120 in the other of the opposite directions 150 and 152, to change each corresponding aiming angle 102 and 132. Thus, with the aiming direction 48 aimed away from directly at the sun 20, the power output of one of the solar modules 162 and 164 will be greater than the power output of the other of the solar modules 162 and 164, and the motor 140 will rotate to tilt the pairs 90 and 120 of the respective solar modules until the aiming direction 48 is in direct alignment with the elevation of the sun 20, as will be described below.

A third motor 170 is affixed to the base 84 and is coupled with the table 80, through a gear box 172, to rotate the table 80 about the vertical axis of rotation 88. A controller is shown in the form of a manually operated electrical switch 180 and connects the second pair 90 of solar modules 92 and 94 to the third motor 170 to power the third motor 170 for rotating the table 80 and, consequently, the frame 40 and the power solar panel 30, as the sun 20 traverses the solar track 22 during the course of a day, and then connecting the third pair 120 of solar modules 122 and 124 to the third motor 170 during a next-consecutive day such that the third motor 170 is powered alternately by the second and third pairs 90 and 120 of solar modules to rotate the table 80, and the power solar panel 30, during consecutive days, while the second motor 140 is powered by the fourth pair 160 of solar modules 162 and 164 to tilt the second and third pairs 90 and 120 into an optimum orientation relative to the solar track 22, that is, into an aiming angle 102 or 132 wherein the corresponding aiming direction 98 and 128 is aligned with the elevation of the solar track 22. As a safety measure, switch 180 preferably is provided with three operating positions, namely, a first position wherein the second pair 90 is connected to motor 170, a second position wherein the third pair 120 is connected to motor 170, and a third position, or "OFF" position, wherein neither of the pairs 90 and 120 is connected to motor 170 and the sun tracker 10 selectively is rendered dormant.

The second pair 90 of solar modules 92 and 94, and the third pair 120 of solar modules 122 and 124 each operate to power the third motor 170, alternately, in a manner similar to that described above in connection with the powering of the first and second motors 50 and 140. Thus, upon exposing the second pair 90 to the sun 20, the difference in the power output between the solar modules 92 and 94 will actuate the motor 170 to move the table 80 until the aiming direction 98 is aligned directly with the sun 20. Likewise, upon exposure of the third pair 120 to the sun 20, the difference in the power output between the solar modules 122 and 124 will actuate the motor 170 to move the table 80 until the aiming direction 128 is aligned directly with the sun 20.

With reference once again to FIGS. 1 through 3, as well as to FIGS. 4 through 9, with the second pair 90 aimed generally toward the sunrise location 26, the second pair 90 will power the motor 170 to rotate the table 80, while the fourth pair 160 will power the motor 140, so as to maintain the aiming direction 98 of the second pair 90 in optimum alignment with the sun 20 at all times during daylight. At the same time, the motor 50 will be powered by the first pair 60 to tilt the platform 32 and the power solar panel 30 so as to maintain an optimum position of the solar panel 30 relative to the sun 20 during daylight. At sunset, the second pair 90 will have been rotated about the vertical axis of rotation 88 such that the second pair 90 is aimed generally toward the sunset location 28. However, the third pair 120 now is aimed generally at the next-consecutive day sunrise location 26, so that upon sunrise of the next-consecutive day, and upon switching to the connection between the third pair 120 and the motor 170, the sun tracker 10 will operate to maintain the optimum alignment position of the power solar panel 30 with the sun 20 throughout the next-consecutive day. Thus, the alternate connection between the motor 170 and each of the second and third pairs 90 and 120 enables the sun tracker 10 to operate during daylight each day of consecutive days while compensating for changes in the solar track 22 throughout the year. To that end, each of the longitudinal directions 100 and 130 along which the corresponding second and third pairs 90 and 130 extend preferably is in a corresponding plane perpendicular to the horizontal direction 43 in which the horizontal axis of rotation 44 extends. In the illustrated preferred construction, the longitudinal directions 100 and 130 are located within a common vertical plane P passing through the vertical axis of rotation 88, generally normal to the horizontal direction 43. At all times during daylight, power from the power solar panel 30 is conducted through a commutator 190 for transmission from the site 12.

The illustrated preferred construction enables the pairs 90 and 120 to be made large enough to utilize solar energy to provide sufficient power to power the motor 170 without requiring any auxiliary source of power. Each pair 90 and 120 has a given weight associated with the large size, and each pair 90 and 120 preferably is spaced apart in opposite transverse directions 182 a corresponding transverse distance from the vertical axis of rotation 88 so as to balance the weight of the pairs 90 and 120 about the vertical axis of rotation 88. Likewise, the weights of the pairs 60 and 160 are balanced about the vertical axis of rotation 88 by spacing the pairs 60 and 160 in opposite horizontal directions 184 a corresponding horizontal distance from the vertical axis of rotation 88.

It will be seen then, that during the course of a day, the sun tracker 10 will maintain the power solar panel 30 in an optimum position relative to the sun 20 during daylight as the sun traverses the solar track 22 from the sunrise location 26 to the sunset location 28. Although the solar track 22 will be altered somewhat each consecutive day of the year, the ability of the sun tracker 10 to aim the power solar panel 30 along an accurately determined azimuth, by virtue of the maintenance of a correct tilt position about the horizontal axis of rotation 44 and a simultaneous correct rotational position about the vertical axis of rotation 88, while at the same time maintaining an optimum position relative to the sun of those pairs of solar modules which power the motors that drive the sun tracker 10, facilitates the use of solar energy to power the sun tracker 10.

It will be seen that the present invention attains all of the objectives and advantages summarized above, namely: Provides a sun tracker powered by solar energy to maintain optimum orientation of a power solar panel relative to the sun during each day of consecutive days; enables the use of a relatively simple and economical solar powered sun tracker in a wide variety of installations, ranging from smaller, domestic installations to larger commercial and industrial installations; increases the efficiency with which solar energy is captured for practical utilization in a wide variety of settings; compensates automatically for changes in the position of the sun in the sky from day to day and over season to season throughout the year, including changes in sunrise and sunset locations of the sun along the horizon, as well as changes in elevation above the horizon; enables the economical construction and practical use of a solar powered sun tracker for greater efficiency in a wider variety of installations, including even small installations where sun trackers heretofore have been too complex for practical use; enables solar powered sun tracking with greater simplicity for widespread economical use; provides solar powered sun tracking with increased reliability and exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A solar powered sun tracker for maintaining a power solar panel in an optimum position relative to the sun during daylight as the sun traverses a solar track elevated above the horizon and extending from a sunrise location to a sunset location during each day of consecutive days, the sun tracker comprising:

a frame rotatable about a vertical direction;

a platform for carrying the power solar panel in an upwardly-facing orientation, the platform being mounted on the frame for tilting about a first horizontal direction to aim the power solar panel along a first aiming direction;

a first motor coupled with the platform for tilting the platform about the horizontal direction in either one of opposite tilt directions to aim the first aiming direction;

a first pair of solar modules extending along the horizontal direction and arrayed in an A-shaped cross-sectional configuration substantially symmetrical about the first aiming direction, the first pair of solar modules being mounted for movement with the platform to tilt with the platform about the horizontal direction and connected to the first motor for powering the first motor to tilt the platform so as to move the first aiming direction into an optimum alignment with the sun in response to exposure of the first pair of solar modules to the sun;

a second pair of solar modules arrayed in an A-shaped cross-sectional configuration substantially symmetrical about a second aiming direction, the second pair of solar modules extending along a corresponding longitudinal direction making a corresponding aiming angle with the vertical direction and mounted on the frame for tilting about a corresponding lateral direction to change the corresponding aiming angle;

a third pair of solar modules arrayed in an A-shaped cross-sectional configuration substantially symmetrical about a third aiming direction, the third pair of solar modules extending along a corresponding longitudinal direction making a corresponding aiming angle with the vertical direction and mounted on the frame, opposite the second pair of solar modules with respect to the horizontal direction, for tilting about a corresponding lateral direction to change the corresponding aiming angle;

a second motor coupled with the second and third pairs of solar modules for tilting each second and third pair of solar modules about a respective corresponding lateral direction to change each respective corresponding aiming angle;

a fourth pair of solar modules arrayed in an A-shaped cross-sectional configuration substantially symmetrical about the first aiming direction, the fourth pair of solar modules extending along the horizontal direction and being mounted for movement with the platform for tilting with the platform about the horizontal direction, the fourth pair of solar modules being connected to the second motor for powering the second motor to tilt each of the second and third pairs of solar modules about a corresponding lateral direction to change a corresponding aiming angle and direct the second and third aiming directions to establish an optimum alignment of each second and third pair of solar modules relative to the sun;

a third motor coupled with the frame for rotating the frame about the vertical direction; and a controller for connecting the second pair of solar modules to the third motor to power the third motor for rotating the frame as the sun traverses the solar track during a day, and for connecting the third pair of solar modules to the third motor during a next-consecutive day such that the third motor is powered alternately by the second and third pairs of solar modules to rotate the frame during consecutive days, while the second motor is powered by the fourth pair of solar modules to tilt the second an third pairs of solar modules into an optimum orientation relative to the sun, and the first motor is powered by the first pair of solar modules to tilt the platform and aim the power solar panel into an optimum orientation relative to the sun during each day.

2. The solar-powered sun tracker of claim 1 wherein the controller comprises a manual switch arrangement for connecting a selected one of the second and third pairs of solar modules to the third motor.

3. The solar-powered sun tracker of claim 1 wherein:
the frame is rotatable about a vertical axis;
the first and fourth pairs of solar modules are mounted upon the frame, diametrically opposite one another with respect to the vertical axis;
each of the first and fourth pairs of solar modules has a given weight; and
each of the first and fourth pairs of solar modules is spaced from the vertical axis a corresponding longitudinal distance which balances the weight of the first and fourth pairs of solar modules about the vertical axis.

4. The solar-powered sun tracker of claim 1 wherein:
the frame is rotatable about a vertical axis;
the second and third pairs of solar modules are mounted on the frame diametrically opposite one another with respect to the vertical axis;
each of the second and third pairs of solar modules has a given weight; and
each of the second and third pairs of solar modules is spaced from the vertical axis a corresponding transverse distance which balances the weight of the second and third pairs of solar modules about the vertical axis.

5. The solar-powered sun tracker of claim 4 wherein:
the first and fourth pairs of solar modules are mounted on the frame diametrically opposite one another with respect to the vertical axis;
each of the first and fourth pairs of solar modules has a given weight; and
each of the first and fourth pairs of solar modules is spaced from the vertical axis a corresponding horizontal distance which balances the weight of the first and fourth pairs of solar modules about the vertical axis.

6. The solar-powered sun tracker of claim 5 wherein the controller comprises a manual switch arrangement for connecting a selected one of the second and third pairs of solar modules to the third motor.

7. The solar-powered sun tracker of claim 1 wherein the corresponding longitudinal directions along which the second and third pairs of solar modules extend are located within a common vertical plane passing through the vertical axis.

8. The solar-powered sun tracker of claim 7 wherein the common vertical plane is generally normal to the horizontal direction about which the platform tilts.

9. The solar-powered sun tracker of claim 8 wherein the controller comprises a manual switch arrangement for connecting a selected one of the second and third pairs of solar modules to the third motor.

10. A method for maintaining a power solar panel in an optimum position relative to the sun during daylight as the sun traverses a solar track elevated above the horizon and extending from a sunrise location to a sunset location during each day of consecutive days, the method comprising:

placing the power solar panel in an upwardly-facing orientation mounted for tilting about a horizontal direction to aim the power solar panel along a first aiming direction, and for rotation about a vertical direction;

coupling a first motor with the power solar panel for tilting the power solar panel about the horizontal direction in either one of opposite tilt directions to aim the first aiming direction;

mounting a first pair of solar modules extending along the horizontal direction and arrayed in an A-shaped cross-sectional configuration substantially symmetrical about the first aiming direction for movement with the power solar panel to tilt with the power solar panel about the horizontal direction;

connecting the first pair of solar modules to the first motor for powering the first motor to tilt the power solar panel so as to move the first aiming direction into an optimum alignment with the sun in response to exposure of the first pair of solar modules to the sun;

providing a second pair of solar modules arrayed in an A-shaped cross-sectional configuration substantially symmetrical about a second aiming direction, the second pair of solar modules extending along a corresponding longitudinal direction making a corresponding aiming angle with the vertical direction, and mounting the second pair of solar modules for tilting about a corresponding lateral direction to change the corresponding aiming angle;

providing a third pair of solar modules arrayed in an A-shaped cross-sectional configuration substantially symmetrical about a third aiming direction, the third pair of solar modules extending along a corresponding longitudinal direction making a corresponding aiming angle with the vertical direction, and mounting the third pair of solar modules diametrically opposite the second pair of solar modules with respect to the vertical direction for tilting about a corresponding lateral direction to change the corresponding aiming angle;

coupling a second motor with the second and third pairs of solar modules for tilting each second and third pair of solar modules about a respective corresponding lateral direction to change each corresponding aiming angle;

providing a fourth pair of solar modules arrayed in an A-shaped cross-sectional configuration substantially symmetrical about the first aiming direction, the fourth pair of solar modules extending along the horizontal direction, and mounting the fourth pair of solar modules for movement with the power solar panel for tilting with the power solar panel about the horizontal direction;

connecting the fourth pair of solar modules to the second motor for powering the second motor to tilt each of the second and third pairs of solar modules about a corresponding lateral direction to change each corresponding aiming angle and direct the second and third aiming directions to establish an optimum alignment of each second and third pair of solar modules relative to the sun;

coupling a third motor with the power solar panel for rotating the power solar panel about the vertical direction; and connecting the second pair of solar modules to the third motor to power the third motor for rotating the power solar panel as the sun traverses the solar track during a day, and connecting the third pair of solar modules to the third motor during a next-consecutive day such that the third motor is powered alternately by the second and third pairs of solar modules to rotate the power solar panel during consecutive days, while the second motor is powered by the fourth pair of solar modules to tilt the second an third pairs of solar modules into an optimum orientation relative to the sun, and the first motor is powered by the first pair of solar modules to tilt the power solar panel and aim the power solar panel into an optimum orientation relative to the sun during each day.

11. The method of claim 10 wherein the second pair of solar modules and the third pair of solar modules are manually connected alternately to the third motor to power the third motor during each day of consecutive days.

* * * * *